United States Patent
Yasaki et al.

(10) Patent No.: US 7,925,879 B2
(45) Date of Patent: Apr. 12, 2011

(54) INFORMATION PROCESSING UNIT WITH INFORMATION DIVISION RECORDING FUNCTION

(75) Inventors: Kouichi Yasaki, Kawasaki (JP); Naoki Nishiguchi, Kawasaki (JP); Isamu Yamada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1207 days.

(21) Appl. No.: 11/537,829

(22) Filed: Oct. 2, 2006

(65) Prior Publication Data
US 2007/0245108 A1  Oct. 18, 2007

(30) Foreign Application Priority Data
Apr. 12, 2006 (JP) .................. 2006-109959

(51) Int. Cl.
*H04L 29/06* (2006.01)
*G06F 7/00* (2006.01)
*G06F 17/00* (2006.01)
(52) U.S. Cl. ........................ 713/165; 707/610
(58) Field of Classification Search .................. 713/165; 707/610
See application file for complete search history.

(56) References Cited

U.S. PATENT DOCUMENTS

| 2002/0108035 A1* | 8/2002 | Herley et al. ................. 713/165 |
| 2003/0233379 A1* | 12/2003 | Cohen et al. ................. 707/200 |
| 2006/0074922 A1* | 4/2006 | Nishimura ................. 707/100 |
| 2008/0320304 A1* | 12/2008 | Fontijn ................. 713/165 |

FOREIGN PATENT DOCUMENTS

| JP | 2004-240699 A | 8/2004 |
| JP | 2005-010957 A | 1/2005 |

* cited by examiner

*Primary Examiner* — Christian LaForgia
(74) *Attorney, Agent, or Firm* — Westerman, Hattori, Daniels & Adrian, LLP

(57) ABSTRACT

An information processing unit is an unit which has an information division recording function in which a file is divided and stored. The information processing unit includes a first storage section for storing a first partial file of a file divided, a second storage section for storing a second partial file, a state detection section for checking an operating state of the information processing unit and detecting that the operating state has changed in a specific manner, and a control section for performing a lock processing in accordance with the state detected to the second partial file stored on the second storage section when the state detected by the state detection section is determined as a risky state in which unauthorized access can be performed.

9 Claims, 15 Drawing Sheets

FIG.2

LAST SYNCHRONIZATION DATE

| FILE NAME | STATUS | LAST ACCESS | STORED AREA | ENCRYPTION |
|---|---|---|---|---|
| A.txt | DONE | 2006/02/22 | Disk | UNDONE |
| BBBB.doc | DONE | 2005/07/21 | Disk | UNDONE |
| CCC.xls | UNDONE | 2006/01/22 | Disk | UNDONE |
| XXXX.doc | UNDONE | 2006/01/22 | EXTERNAL DEVICE | UNDONE |
| YYYY.doc | UNDONE | 2006/02/24 | Disk | DONE |

FIG.3

| FILE NAME | LAST EDIT DATE |
|---|---|
| A.txt | 2006/06/22 |
| BBBB.doc | 2005/07/21 |
| CCC.xls | 2006/01/14 |
| XXXX.doc | 2006/01/22 |
| | |

FIG.4

| USER | TERMINAL | SOFTWARE | LOCK PROCESSING |
|---|---|---|---|
| ○ | --- | × | ERASURE, ENCRYPTION |
| ○ | REMOVED | ○ | ERASURE |
| ○ | --- | ○ | NO PROCESSING |
| × | × | --- | ERASURE, ENCRYPTION |
| | | | |

FIG.5

| | FILE | HDD | CACHE MEMORY | EXTERNAL MEMORY | SYNCHRONIZED/ UNSYNCHRONIZED |
|---|---|---|---|---|---|
| (a) | A=(A1+A2) | A1 | A2 | NOT-CONNECTED | UNSYNCHRONIZED |
| (b) | A=(A1+A2) | A1 | A2 | A2 | SYNCHRONIZED |
| (c) | A'=(A1'+A2') | A1' | A2' | A2 | UNSYNCHRONIZED |
| (d) | A'=(A1'+A2') | A1' | A2' | A2' | SYNCHRONIZED |

(b) AFTER CONNECTING EXTERNAL MEMORY
(c) AFTER EDITING FILE A
(d) COPY A2' TO EXTERNAL MEMORY

IF STATE DETECTION EXISTS

| | FILE | HDD | CACHE MEMORY | EXTERNAL MEMORY | SYNCHRONIZED/ UNSYNCHRONIZED |
|---|---|---|---|---|---|
| (e1) | A=(A1+A2) | A1 | A2 | A2 | SYNCHRONIZED |
| (e2) | A=(A1+A2) | A1 | ---(ERASURE) | A2 (NOT-CONNECTED) | UNSYNCHRONIZED |

(ERASE SYNCHRONIZED FILE)

IF STATE DETECTION EXISTS

| | FILE | HDD | CACHE MEMORY | EXTERNAL MEMORY | SYNCHRONIZED/ UNSYNCHRONIZED |
|---|---|---|---|---|---|
| (f1) | A'=(A1'+A2') | A1' | A2' | A2 | UNSYNCHRONIZED |
| (f2) | A'=(A1'+A2') | A1' | # A2' | A2 | UNSYNCHRONIZED |

(ENCRYPT FILE A2')

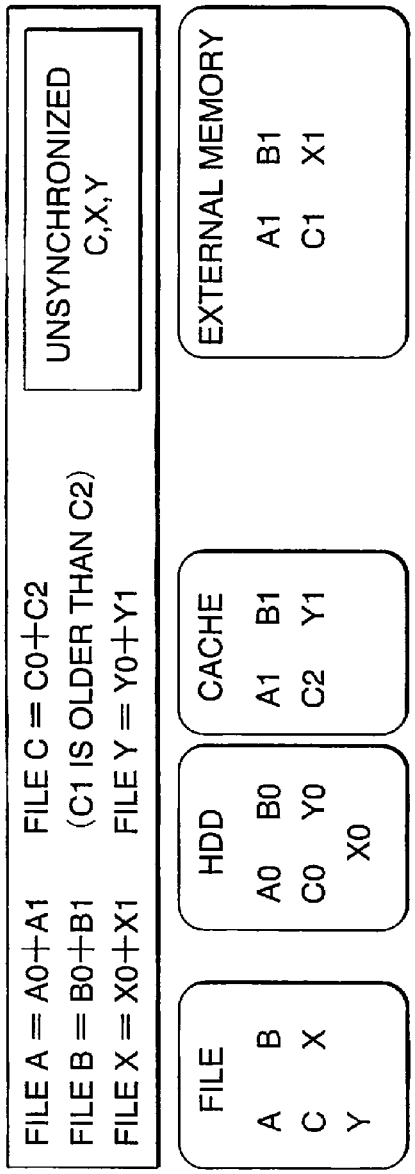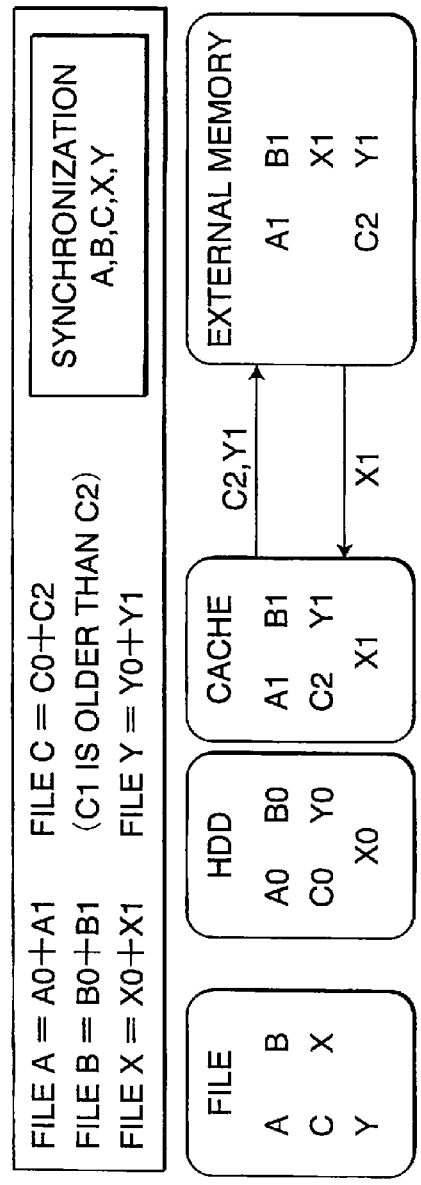
FIG.6 (a) BEFORE SYNCHRONIZATION PROCESSING
FIG.6 (b) AFTER SYNCHRONIZATION PROCESSING

INFORMATION PROCESSING UNIT WITH INFORMATION DIVISION RECORDING FUNCTION

CROSS-REFERENCE TO RELATED APPLICATIONS

This application is related to Japanese application No. 2006-109959 filed on Apr. 12, 2006, whose priority is claimed under 35 USC §119, the disclosure of which is incorporated by reference in its entirety.

BACKGROUND OF THE INVENTION

1. Field of the Invention

The present invention relates to an information processing unit, and in particular, to an information processing unit having an information division recording function capable of preventing unauthorized leakage and unauthorized use of user data stored on the information processing unit such as a PC.

2. Description of the Related Art

When a document is prepared with an information processing unit such as a PC, the document is usually stored as one file on a hard disk or a movable memory medium (e.g., USB memory). However, in a case where the document is stored simply as one file, the content of the file may be subjected to unauthorized use easily if the PC is stolen.

Thus, antitheft measures such as storing the file with encryption or with read restriction requiring a password input have been taken.

In order to further improve the security, a method in which a prepared document is not stored as one file but is divided to be stored separately on two recording media has been adopted.

For example, a prepared document "A" is divided into two files (A1, A2). One file A1 is stored on a hard disk built in the PC, and the other file A2 is stored on a movable USB memory.

When the document A is read, the both files (A1 and A2) are read and constructed into the document A and then displayed or the like. Therefore, the document A cannot be read and edited without the USB memory since the file A2 is missing.

Accordingly, even if only a PC is stolen in a state where the USB memory is removed, the document A in the PC cannot be opened only with the file A1, so it is possible to reduce risks of unauthorized leakage and unauthorized use of data.

Japanese Patent Laid-Open Publication No. 2005-10957 proposes an encryption system using a cache memory, having a cache invalidating function for invalidating old data on the cache memory in accordance with switching between ON and OFF of an encrypting function in order to prevent unencrypted data from remaining on the cache memory.

Also, Japanese Patent Laid-Open Publication No. 2004-240699 proposes a content protection system in which a content is encrypted and written on an HDD, when the content is read, a cache memory is used for temporary storage, and when reading and writing using the cache memory have been completed, the content on the cache memory is completely erased to thereby prevent unauthorized leakage of data.

However, in the conventional method for preventing unauthorized use, a USB memory must be connected to a PC for editing or viewing a prepared file. Therefore, even an authorized user may not be able to edit the file without the USB memory.

Further, the USB memory must be kept connected during editing the file, which might be inconvenient for the user.

Accordingly, when the user leaves only for a while, if the USB memory is kept connected so as not to interrupt the work, the USB memory and the PC are at risk of being stolen together.

That is, even though data is divided and stored, there is a risk of data leakage by theft.

Since the user cannot remove the USB memory at free timing of the user, the same risk is involved if the user forgets to remove the USB memory when leaving.

In order to solve the risk mentioned above even slightly while considering the convenience for the user, it is desired to enable editing even in a state where the USB memory is not connected.

Although there is a case where editing can be continued without a USB memory by storing data on a cache memory as disclosed in Patent Laid-Open Publication No. 2005-10957 and Japanese Patent Laid-Open Publication No. 2004-240699, information on the cache memory is erased completely after a processing such as reading and writing a file has been completed. Therefore, in order to edit the file again, the USB memory must be connected, so this is inconvenient for the user.

SUMMARY OF THE INVENTION

According to the invention, there is provided an information processing unit having an information division recording function in which a file is divided and stored, including: a first storage section for storing a first partial file of a file divided; a second storage section for storing a second partial file; a state detection section for checking an operating state of the information processing unit and detecting that the operating state has changed in a specific manner; and a control section for performing a lock processing in accordance with the state detected to the second partial file stored on the second storage section when the state detected by the state detection section is determined as a risky state in which unauthorized access can be performed.

According to this configuration, when a risky state where unauthorized access is possible is detected, a lock processing corresponding to the detected risky state is performed to the second partial file stored on the second storage section. Therefore, it is possible to further reduce unauthorized use of a file by preventing leakage or falsification of information caused by unauthorized access while considering the convenience for a user.

BRIEF DESCRIPTION OF THE DRAWINGS

FIG. 2 is an illustration of an embodiment of a file management table according to the present invention;

FIG. 3 is an illustration of an embodiment of a management table of an external memory according to the present invention;

FIG. 4 is an illustration of an embodiment of a state detection determination table according to the present invention;

FIG. 5 is an illustration of an embodiment of a synchronized state according to the present invention;

FIG. 6 is an illustration of an embodiment of a synchronization processing according to the present invention;

DESCRIPTION OF THE PREFERRED EMBODIMENTS

Figure 1:
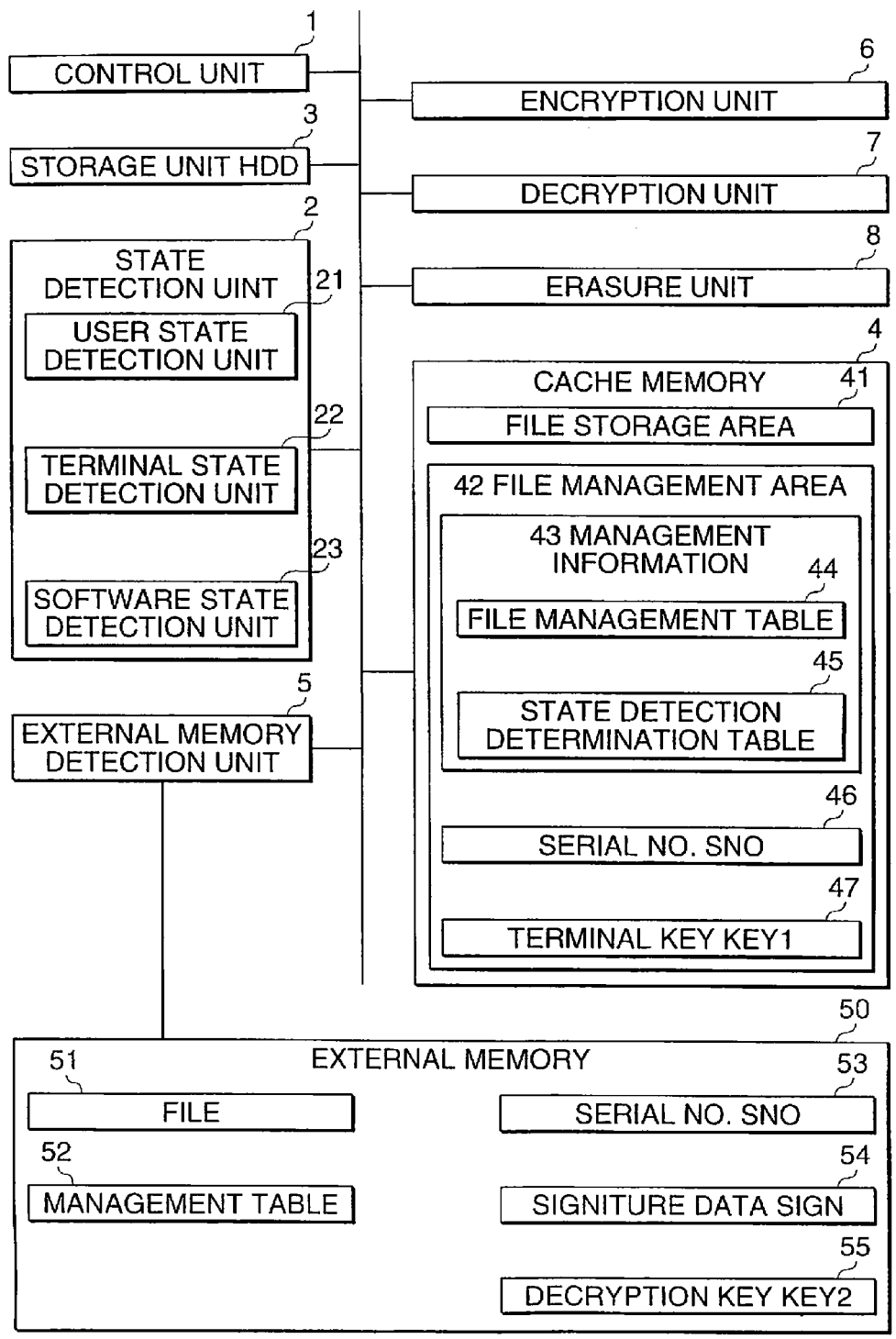
FIG. 1 is a configuration block diagram of an embodiment of an information processor according to the present invention.

The present invention provides an information processing unit capable of reducing risks of unauthorized leakage and unauthorized use of data by storing a part of data currently being edited on a nonvolatile memory but encrypting or partially erasing the data stored on the nonvolatile memory in accordance with the states of the information processor and an external memory.

According to the present invention, there is provided an information processing unit having an information division recording function in which a file is divided and stored, including: a first storage section for storing a first partial file of a file divided; a second storage section for storing a second partial file; a state detection section for checking an operating state of the information processing unit and detecting that the operating state has changed in a specific manner; and a control section for performing a lock processing in accordance with the state detected to the second partial file stored on the second storage section when the state detected by the state detection section is determined as a risky state in which unauthorized access can be performed.

According to the present invention, the lock processing includes an erasure processing of a synchronized file and an encryption processing of an unsynchronized file, and the synchronized file is a second partial file in the second storage section which has also been stored on a removable external nonvolatile memory, and the unsynchronized file is a second partial file in the second storage section which is not stored on a removable external nonvolatile memory.

Further, the state detection section includes at least one of: a user status detection section for detecting identification information for specifying a user and an attending state indicating presence of a user; a terminal state detection section for detecting an operating state of hardware constituting the information processing unit; and a software state detection section for detecting an operating state of software of which activation is authorized.

According to the present invention, there is further included an external memory detection section for detecting whether a removable external nonvolatile memory is connected or not, wherein, when the external memory detection section detects that a nonvolatile memory is connected, the control section copies a second partial file stored on the second storage section but not stored on the nonvolatile memory to the nonvolatile memory.

There is further included an external memory detection section for detecting whether a removable external nonvolatile memory is connected or not, wherein, when the external memory detection section detects that the nonvolatile memory is not connected any more, the control section erases only the second partial file stored on the second storage section, out of the second partial files stored on both the second storage section and the nonvolatile memory.

According to this configuration, by storing a part of the edited file (second partial file) on a removable external nonvolatile memory and erasing it from the second storage section in the processor, it is possible to further reduce unauthorized leakage and unauthorized use of information when the processor is stolen.

There is further included an external memory detection section for detecting whether a removable external nonvolatile memory is connected or not, wherein, when the external memory detection section detects that the nonvolatile memory is not connected any more, the control section does not erase the second partial file stored on the second storage section, if it is currently edited, out of the second partial files stored on both the second storage section and the nonvolatile memory.

According to this configuration, since the second partial file is stored on the second storage section even after the external nonvolatile memory is removed, file editing can be continued, which ensures convenience for the user.

There is further included an external memory detection section for detecting whether a removable external nonvolatile memory is connected or not, wherein, when the external memory detection section detects that the nonvolatile memory is not connected any more, the control section encrypts the second partial file stored on the second storage section if the second partial file stored on the second storage section and the second partial file stored on the nonvolatile memory do not coincide.

According to this configuration, after the external nonvolatile memory is removed, an authorized user who knows a key to decrypt the encrypted file can continue editing of the file easily without connecting the nonvolatile memory. Therefore, it is possible to ensure convenience for the user and to ensure security by reducing unauthorized use.

Further, the second partial file encrypted is decrypted by using a decryption key stored on an external nonvolatile memory.

According to this configuration, a removable external nonvolatile memory must be connected to decrypt the encrypted file. Therefore, a third party who does not have the nonvolatile memory on which the decryption key is stored cannot decrypt the file, which enables to further reduce unauthorized used of the file.

Further, when the state detection section detects the risky state, the control section performs one or both of a lock processing to erase the synchronized file and a lock processing to encrypt the unsynchronized file.

If the state detection section detects that presence of a user is not confirmed and software not authorized by the user is activated, the control section determines the state as a risky state, and performs the erasure processing of the synchronized file and the encryption processing of the unsynchronized file.

According to this configuration, editing of the unsynchronized file can be continued even if the external nonvolatile memory is not connected. Therefore, it is possible to ensure convenience for the user, and to prevent unauthorized use by erasing the synchronized file from the inside of the processing unit.

Further, if the state detection section detects that presence of a user is not confirmed and an external memory is not connected, the control section determines the state as a risky state, and performs the erasure processing of the synchronized file.

According to this configuration, it is possible to prevent unauthorized leakage and unauthorized use of the synchronized file.

Further, the present invention is to provide an information processing unit having an information division recording function in which a file is divided into $n(n \geq 2)$ and stored. The information processing unit comprises: a plurality of storage sections (M1, . . . Mn) for respectively storing divided partial files (A1, . . . An); a state detection section for checking an operating state of the information processing unit and detecting that the operating state has changed in a specific manner; and a control section to perform a lock processing, when the state detected by the state detection section is determined as a risky state in which unauthorized access can be performed, in accordance with the detected state to partial files (A2, . . . An) other than a first partial file A1 stored on the first storage section M1.

In the present invention, as the first storage section, a nonvolatile large-capacity storage device fixedly provided in the processing unit and capable of reading and writing data is used. For example, a hard disk (HDD) is used.

As the second storage section, a nonvolatile recording element fixedly provided in the processing unit and capable of reading and writing data is used. In particular, in order to ensure sufficient security for preventing unauthorized access, it is preferable to use a recording element such as a memory LSI or a cache memory having a special structure.

Hereinafter, the second storage section is also called as a cache memory.

The state detection section and the control section can be realized by a microcomputer mainly including a CPU, a ROM, a RAM, an I/O control unit and a timer.

Further, these functions are realized by the CPU operating various kinds of hardware based on control programs stored on the ROM and the like.

In the present invention, operating states of the information processor include a state of detecting identification information for specifying an authorized user using the processor, and a state of having detected that the authorized user is present near the processor. When these states are detected, it is determined as not a risky state in which unauthorized access can be made.

In contrast, in an operating state in which presence of the authorized user cannot be detected, it is determined as a risky state in which unauthorized access can be made.

A risky state means a state in which an unauthorized third party can read or rewrite information stored in the processor, in which leakage or falsification of information can be easily performed by unauthorized access.

Further, operating states of the information processing unit include an operating state of hardware of the processing unit and state changes. Such states include, for example, changes caused by alteration, addition, deletion and the like of hardware such as the processor itself being restarted, a removable nonvolatile memory being connected, connected network being changed, a memory board being added, and a connected state of the hardware being changed to a specific state.

If an unauthorized memory board is added or a removable nonvolatile memory is connected for example, it is determined as a risky state in which unauthorized access can be made.

Operating states of the information processing unit include operating states and state changes of software installed in the processing unit.

For example, if there is a state change such as detection of virus or spyware, detection of activation of unauthorized software, uninstall of authorized software and a change in setting, it is determined as a risky state in which unauthorized access can be made.

In the present invention, a lock processing is a processing performed to the second partial file stored on the second storage section. It does not mean simply prohibiting access to the second partial file but means changing the second partial file such that an unauthorized third party cannot read or rewrite the content of the second partial file.

Therefore, after a lock processing is performed, an authorized user can restore the second partial file so as to normally access.

In the present invention, a lock processing includes an erasure processing of a synchronized file. However, the present invention is so adapted that even after the synchronized file is erased, an authorized user can restore the synchronized file on the second storage section from an external nonvolatile memory. In order to confirm the authorized user, it is preferable to confirm identification information of the user and to determine the validity of the nonvolatile memory when the synchronized file is restored on the second storage section.

A synchronized file means a file stored on both of a second storage section and an external nonvolatile memory. If the same files exist on both of the second storage section and the nonvolatile memory, synchronization is said to be taken.

Further, an encryption processing of an unsynchronized file is also a kind of the lock processing. The encryption processing also corresponds to the lock processing since a third party who does not know the decryption method cannot restore the encrypted file to the original unsynchronized file. An authorized user can restore the encrypted file to the original unsynchronized file by using a predetermined decryption key.

An unsynchronized file means a second partial file which is stored on the second storage section but is not stored on an external nonvolatile memory. However, a second partial file which is not stored on the second storage section but is stored on an external nonvolatile memory may be considered as an unsynchronized file.

As described above, a state where a file is stored on either the second storage section or an external nonvolatile memory is considered that it is in an unsynchronized state or synchronization is not taken.

In the present invention, a removable external nonvolatile memory means an USB memory connectable/removable to/from an USB terminal, an IC memory card, a mobile telephone incorporating a nonvolatile memory or small HDD, an external storage device such as a music player, a memory such as a USB memory connectable wirelessly, or the like. As a nonvolatile memory capable of reading and writing, a flash memory, a movable small hard disk or the like is used.

An external memory detection section means a unit for connecting an external nonvolatile memory, which corresponds to a connector, an I/O bus or the like. For example, if an USB memory is used as a nonvolatile memory, a USB connecter corresponds to the external memory detection section.

For encryption and decryption in the present invention, well-known encryption methods can be used. Also, RSA encryption of public key encryption and AES encryption of common key encryption, for example, are also applicable.

Further, in embodiments of the present invention described below, a case where a file is divided into two partial files will be described. Alternatively, a file may be divided into three or more files.

For example, in a case of dividing into three partial files, one partial file may be stored on a hard disk, and the other two partial files may be separately stored on a cache memory in the processing unit and on an external USB memory. If the dividing number increases, security can be further improved, but operations for editing and file decryption become complex, thereby convenience for the user will be lowered.

Hereinafter, the present invention will be described in detail based on embodiments shown in the drawings. Note that the present invention is not limited to this description.

<Configuration Block of Information Processor>

FIG. 1 is a configuration block diagram showing an embodiment of an information processor (processing unit) according to the present invention.

In FIG. 1, the information processor of the present invention mainly consists of a control unit 1, a state detection unit 2, a file recording unit (HDD) 3, a cache memory 4, an external memory detection unit 5, an encryption unit 6, a decryption unit 7, and a data erasure unit 8.

The control unit 1 is a unit for controlling operation of other respective functional blocks, consisting of a microcomputer including a CPU, a ROM, a RAM, an I/O control unit, a timer and the like.

Further, various functions of the present invention are realized by the CPU causing respective hardware to operate based on control programs stored on a ROM or the like.

The file recording unit (HDD) 3 corresponds to the first storage section mentioned above, and is a nonvolatile recording device having relatively large capacity for storing information prepared or captured by a user such as documents, images and voice data. For example, a hard disk is used.

The cache memory 4 corresponds to the second storage section mentioned above, and is a nonvolatile memory for temporarily storing data. It is a memory such as a hidden partition of a HDD to which only BIOS can access or a part of a main memory to which only BIOS can access by a chip set. In this memory, a part of the file in editing is stored. Further, the cache memory 4 is a memory that a user cannot easily read or write directly like the HDD 3. It is preferable to provide under access restriction by the hardware so as to prevent unauthorized access.

The external memory detection unit 5 is an interface for connecting an external memory 50 to this processor.

For example, if a so-called USB memory is used as the external memory 50, it is an interface having a structure conforming to the standard of USB capable of connecting an external device having a USB interface.

Further, the external memory detection unit 5 is a unit for detecting connection when the external memory 50 is connected. It also detects that the external memory 50 is removed from the processor.

Whether the external memory 50 is connected or not can be detected with presence or absence of current or voltage flowing to a predetermined terminal.

The external memory 50 is a movable nonvolatile memory which is connectable/removable. A memory such as a USB memory is used as described above.

The encryption unit 6 is a unit for encrypting prepared files, image data and the like. Encryption can be performed by an existing encryption method as described above.

The decryption unit 7 is a unit for decrypting files or the like encrypted by the encryption unit 6, to original files. For security reasons, decryption is performed by using a decryption key stored on the external memory 50 or the like.

The erasure unit 8 is for erasing all or a part of a file stored on the HDD 3 or on the cache memory 4 by an erasing instruction from a user or by the lock processing as described later.

The state detection unit 2 is a unit for detecting the states of hardware and software of the information processor and detecting presence or absence of a user using the processor. The state detection unit 2 is used for determining whether or not to start the lock processing as described later.

In this case, the state detection unit 2 mainly includes a user state detection unit 21, a terminal state detection unit 22 and a software state detection unit 23.

The user state detection unit 21 is a unit for detecting whether or not a user stays near the information processor, detecting presence of the user through a response to a signal transmitted periodically from a terminal, or authenticating whether or not a user has an authorization to use by a user authentication mechanism provided to the terminal. Detection of presence of a user can be performed in accordance with whether a non-contact IC card such as an active tag or Bluetooth is held or not.

The terminal state detection unit 22 is a unit mainly for detecting changes in the state of hardware of the information processor. The external memory detection unit 5, described above, may be considered as one functional block of the terminal state detection unit 22.

Further, the terminal state detection unit is also for detecting that the processor itself is restarted or a network connected has been changed, for example.

In this case, the processor having been restarted can be detected from the state of the security chip. Further, the network connection having been changed can be detected from the state of the network chip.

The software state detection unit 23 is a unit for checking if software installed in the information processor is not activated. For example, this software state detection unit checks if a software not authorized by a user owning the processor is not activated.

When a predetermined specific state is detected by the above-described state detection unit 2, a predetermined lock processing is performed to prevent unauthorized use or data leakage. A lock processing means partial erasure or encryption of data stored on the cache memory as described later.

<Description of Contents of Recording File, etc.>

Next, a file recorded on the HDD 3 and the like will be described.

In the information processor of the present invention, if a user prepares a document file A and instructs to store it, the document file A is divided into two files (A1, A2). One file A1 is stored on the HDD 3, and the other file A2 is stored on the cache memory 4.

Further, if the external memory 50 is connected, the one file A1 is stored on the HDD 3 but the other file A2 is stored on the external memory 50.

The external memory 50 has an area for storing the file itself (file recording area 51) and an area for storing a management table 52 for identifying the stored file.

FIG. 3 is an illustration showing an embodiment of the management table 52 of the external memory.

The management table 52 includes file names of files stored on the external memory and last edit dates thereof.

For example, it is indicated that a file with a file name "A.txt" was last edited on Jun. 22, 2006, and a part of this file is stored on the external memory 50.

Further, on the external memory 50, a serial No. (SNO) 53 for specifying the external memory, signature data (SIGN) 54, and a decryption key (KEY2) 55 are stored.

The information (53, 54, 55) is preferably stored in a format which cannot be changed or erased easily by users and third parties.

The cache memory 4 includes an area for storing the file itself (file area 41), and a file management area 42 for storing information for managing the state of the file (management information 43). The management information 43 includes a file management table 44 showing the state of the stored file, and a state detection determination table 45.

Further, on the cache memory 4, a serial number (SNO) 46 of an external memory usable with this processor and a terminal key (KEY1) 47 used in a file decryption processing are stored.

However, the information (44 to 47) of the table, serial No. and the like may be stored on a memory other than the cache memory 4 if in the secure state, for example, on the hard disk 3.

FIG. 2 is an illustration showing an embodiment of the file management table 44.

In FIG. 2, "status" is information showing whether synchronization has been taken or not between the cache memory 4 and the external memory 50. "Done" means synchronization has been taken, and "undone" means synchronization has not been taken. "Stored area" is information indicating a location where the file is currently stored, in which "Disk" indicates that the file is stored on the cache memory 4 and "external device" indicates that the file is stored on the external memory 50.

"Encryption" is information indicating whether the file is stored in an encrypted state or not. "Undone" indicates that the file is not encrypted, and "done" indicates that the file is stored in an encrypted state.

FIG. 4 is an illustration showing an embodiment of the state detection determination table 45.

"User" is information indicating whether a user checked by the user state detection is detected or not. "o" indicates that the user is properly detected, and "x" indicates an abnormal state where the user is not detected.

"Terminal" is information indicating the state of the terminal checked by terminal state detection. For example, "removed" means an external memory is removed from the terminal, and "x" means an abnormality other than removal is caused.

"Software" means information indicating the state of software checked by software state detection. "o" indicates that unauthorized software is not activated, and "x" indicates that unauthorized software is activated.

"Lock processing" indicates what sort of processing is performed to a combination of three detection states in the table 45. For example, "erasure" means a part of the file on the cache memory 4 is to be erased.

Further, "encryption" means the file on the cache memory 4 is to be encrypted and stored on the cache memory 4 as it is.

The present invention is characterized in erasing a synchronized file in which synchronization has been taken, and encrypting an unsynchronized file in which synchronization has not been taken.

In the present invention, as a result of performing three kinds of state detection processings, it is checked that to which combination in the table 45 each detection state matches, and the lock processing of the matched combination is performed.

<Description of Synchronization Processing>

A synchronization processing of a file will be described.

FIG. 5 is an illustration showing necessity of synchronization.

The prepared file A is divided into two files (A1, A2), and is stored on the HDD 3 and the cache memory 4 (FIG. 5(a)).

Further, if the external memory 50 is connected, the file A2 to be stored on the cache memory 4 is also stored on the external memory 50 (FIG. 5(b)).

Namely, synchronization control is performed such that the file stored on the cache memory 4 and the file stored on the external memory 50 coincide.

In the present invention, a file can be edited even in a state where the external memory 50 is not connected.

Therefore, when the file A is edited in a state without the external memory 50 and stored, the edited file A' is divided into two files (A1', A2'). One file A1' is stored on the HDD 3, and the other file A2' is stored on the cache memory 4 (FIG. 5(c)).

Assuming that the file A before editing, is divided and stored on the HDD 3 and on the external memory 50 as shown in FIG. 5(b), the file A2' stored on the cache memory 4 and the file A2 stored on the external memory 50 are different from each other.

In this case, the cache memory 4 and the external memory 50 are in an unsynchronized state.

When the external memory 50 on which the file A2 is stored is connected in the state shown in FIG. 5(c), states of the file stored on the cache memory 4 and the file stored on the external memory 50 must be coincided in order to continue editing thereafter.

If there are files (A2' and A2) in which synchronization has not been taken when the external memory 50 is connected, the file A2' is copied to the external memory 50 so as to be synchronized (FIG. 5(d)).

Further, if the predetermined abnormal state is detected by the state detection unit 2, a processing such as (e2) or (f2) in FIG. 5 will be performed.

For example, in FIG. 5, (e1) shows the same state as (b). However, if it is detected that the user removed the external memory and left the seat in this state, the synchronized file A2 stored on the cache memory is erased for ensuring the security. Therefore, if only the processor itself is stolen, the file A cannot be edited.

Further, in FIG. 5, (f1) shows the same state as (c), but a partial file A2' of the file A in editing is not synchronized with the partial file A2 of the external memory 50.

In such a state, if unauthorized activation of software is detected, the partial file A2' stored on the cache memory 4 is encrypted, and is overwritten and stored as an encrypted file #A2'.

Thereby, even if the processor itself is stolen, the file A cannot be edited unless the file #A2' is decrypted.

FIG. 6 shows a schematic illustration of an embodiment of a synchronization processing of the present invention.

FIG. 6(a) shows an example of the HDD 3, the cache memory 4, the external memory 50 and file status, in an unsynchronized state.

In this example, it is assumed that four files (A, B, C, Y) are divided and stored on the hard disk HDD 3 and the cache memory 4. For example, the file C is stored such that a partial file C0 is stored on the HDD 3 and a partial file C2 is stored on the cache memory 4.

On the other hand, parts (A1, B1, C1, X1) of four files (A, B, C, X) are assumed to be stored on the external memory 50.

A partial file C2 and a partial file C1 in FIG. 6 are parts of the same file C, but the last edit dates thereof are assumed to be different, and the file C1 stored on the external memory 50 is assumed to have the older edit date. In such a state, when the external memory 50 is connected to the processor, the synchronization processing is performed and the state becomes as shown in FIG. 6(*b*).

FIG. 6(*b*) shows a stored state of the file after the external memory 50 is connected.

First, the files A and B have been synchronized, so nothing will be performed.

For the file C, when comparing the both tables (44, 52), it is found that a partial file C2 stored on the processor is newer, so the partial file C2 stored on the cache memory 4 is copied to the external memory 50. Thereby, the file C is synchronized.

For the file Y, when comparing the both tables, it is found that it does not exist on the external memory 50, so a partial file Y1 of the file Y stored on the cache memory 4 is copied to the external memory 50.

For the file X, when comparing the both tables (44, 52), it is found that it exists only on the external memory 50, so a file X1 is copied to the cache memory 4. Thereby, the file X is in a state where editing can be performed together with a partial file X0 stored on the hard disk HDD 3.

As described above, by comparing the two tables (44, 52) and copying partial files, the cache memory 4 and the external memory 50 are synchronized, and the subsequent editing becomes possible. After synchronization, information on the both tables (44, 52) is updated to the latest state.

<Explanation of Operation of Information Processor of the Present Invention>

Figure 7:
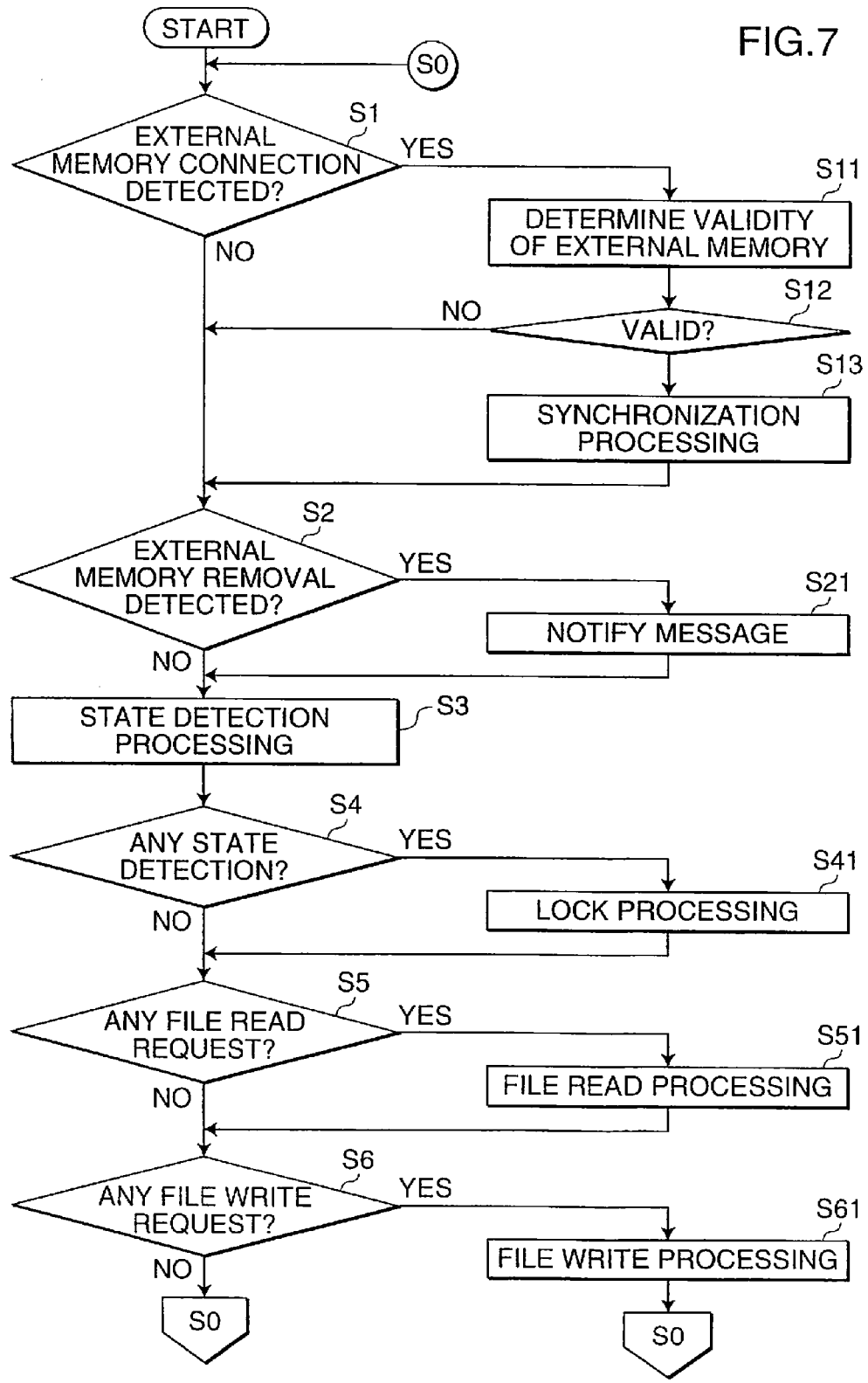
FIG. 7 is an overall schematic flowchart of the information processor according to the present invention.

FIG. 7 shows an overall flowchart describing an example of schematic operation of the information processor according to the present invention.

In FIG. 7, first, the external memory detection unit 5 checks whether the external memory 50 is connected.

If it is detected that the external memory 50 is connected, the processing proceeds to step S11, and the external memory 50 is checked whether it is of an authorized user or one that connection is permitted (validity determination).

In step S12, if it is valid, the processing proceeds to step S13. If it is invalid, the processing proceeds to the next step S2.

In step S13, the management tables (44, 52) of the cache memory 4 and the external memory 5 are compared, and it is checked whether synchronization is taken between the cache memory 4 and the external memory 5. If synchronization has not been taken, the processing to take synchronization is performed to the unsynchronized file.

Next, in step S2, it is checked whether the external memory 50 is removed.

If it is detected that the external memory 50, which has been connected, is removed, the processing proceeds to step S21, and an alerting message is notified to the user.

Next, in step S3, three state detections are checked by the state detection unit 2.

That is, the user state detection unit 21 checks the user state, the terminal state detection unit 22 checks the terminal state, and the software state detection unit 23 checks the software state.

Then, in step S4, the results obtained by the respective kinds of state detection processings are compared with the state detection determination table 45 in FIG. 4.

If a state requiring the lock processing is detected by the result of comparison, the processing proceeds to step S41, and the lock processing is performed. In the lock processing, an encryption or erasure processing is performed based on the synchronization state of the current file.

In step S5, it is checked whether there is a file read request.

If there is a file read request, the processing proceeds to step S51, and a required file is read out with reference to the file management table 44.

Since the file is dividedly stored in principle, one is read out from the HDD 3 but the other one is read out from the cache memory 4 or the external memory 50.

In step S6, it is checked whether there is a file write request.

If there is a file write request, the processing proceeds to step S61, and the file is divided into two with reference to the file management table 4, and one is stored on the HDD 3 and the other one is stored on the cache memory 4.

If the external memory 50 is connected, the other file is also stored on the external memory 50.

The overall schematic flow of the processor is as described above. However, it is not necessary to perform in the order of this flow.

The order of respective branch determinations may be changed, and each branch determination may be divided into a plurality of tasks and may be operated separately through time-division multiplex.

Hereinafter, detailed examples of the state detection processing (step S3) in FIG. 7 and of each processing after branching will be described.

<Validity Determination of External Memory>

Figure 8:
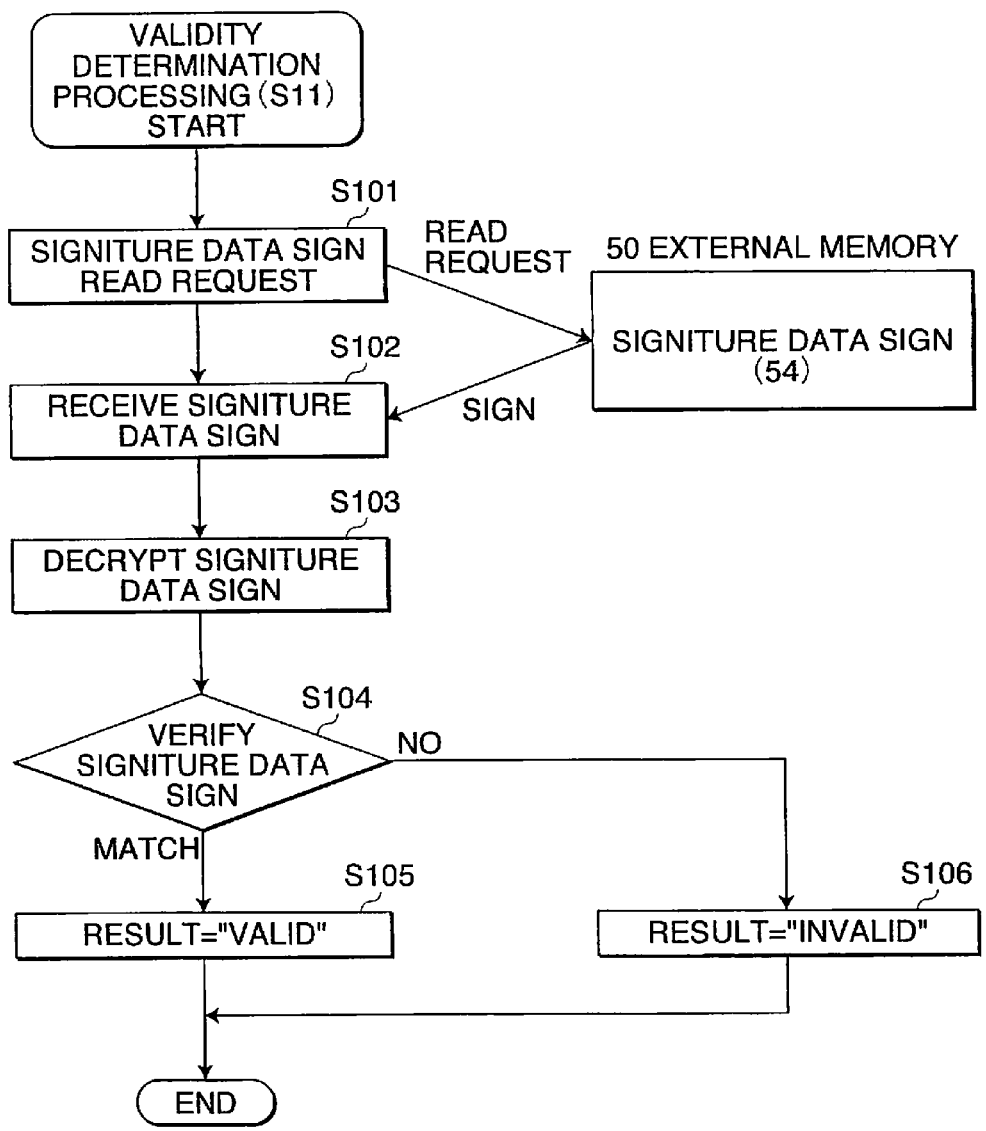
FIG. 8 is a flowchart showing a validity determination processing according to the present invention.

FIG. 8 shows a flowchart of a validity determination processing of the external memory according to the present invention.

In order to determine the validity of the external memory, a serial number SNO 53 previously stored on the external memory 50 is used.

The serial number SNO 53 is a number unique to the external memory 50. It is transmitted to the information processor when connected for the first time, and is stored on the cache memory 4. The cache memory 4 may store it directly as the serial number SNO 46, but may store it in an encrypted state.

Further, when the control unit 1 receives the serial number SNO 53, the control unit 1 encrypts the serial number SNO 53 by using a terminal key KEY1 (41) previously stored on the cache memory 4, and prepares signature data SIGN (54).

In step S1, if it is detected that the external memory 50 is connected, in step S101 in FIG. 8, the control unit 1 transmits a read request of signature data SIGN to the external memory 50.

When the external memory 50 receives the read request, it reads out the signature data SIGN 54 stored, and transmits it to the processor.

In step S102, the signature data SIGN transmitted from the external memory 50 is waited, and when reception is confirmed, the processing proceeds to step S103.

On the other hand, if it cannot be received although not shown, it is determined as invalid, and the processing ends with the result "invalid".

In step S103, the received signature data SIGN 54 is decrypted. That is, the signature data SIGN 54 is decrypted to the original serial number SNO 53 by using the terminal key KEY1.

In step S104, the serial number SNO 53 obtained from the signature data SIGN 54 and the serial number SNO 46 stored on the cache memory 4 are compared and verified.

As a result of comparison, if they coincide, the external memory 50 is considered as valid, so the processing proceeds to step S105, and the processing ends with the result "valid".

On the other hand, if the both serial numbers do not coincide, the external memory 50 is considered as invalid, so the processing proceeds to step S106, and the processing ends with the results "invalid".

Thereby, it is possible to ensure the security when the external memory 50 having a serial number different from the serial number SNO 46 previously stored on the cache memory is connected, whereby unauthorized leakage or unauthorized usage of the data can be reduced.

<Synchronization Processing>

Figure 9:
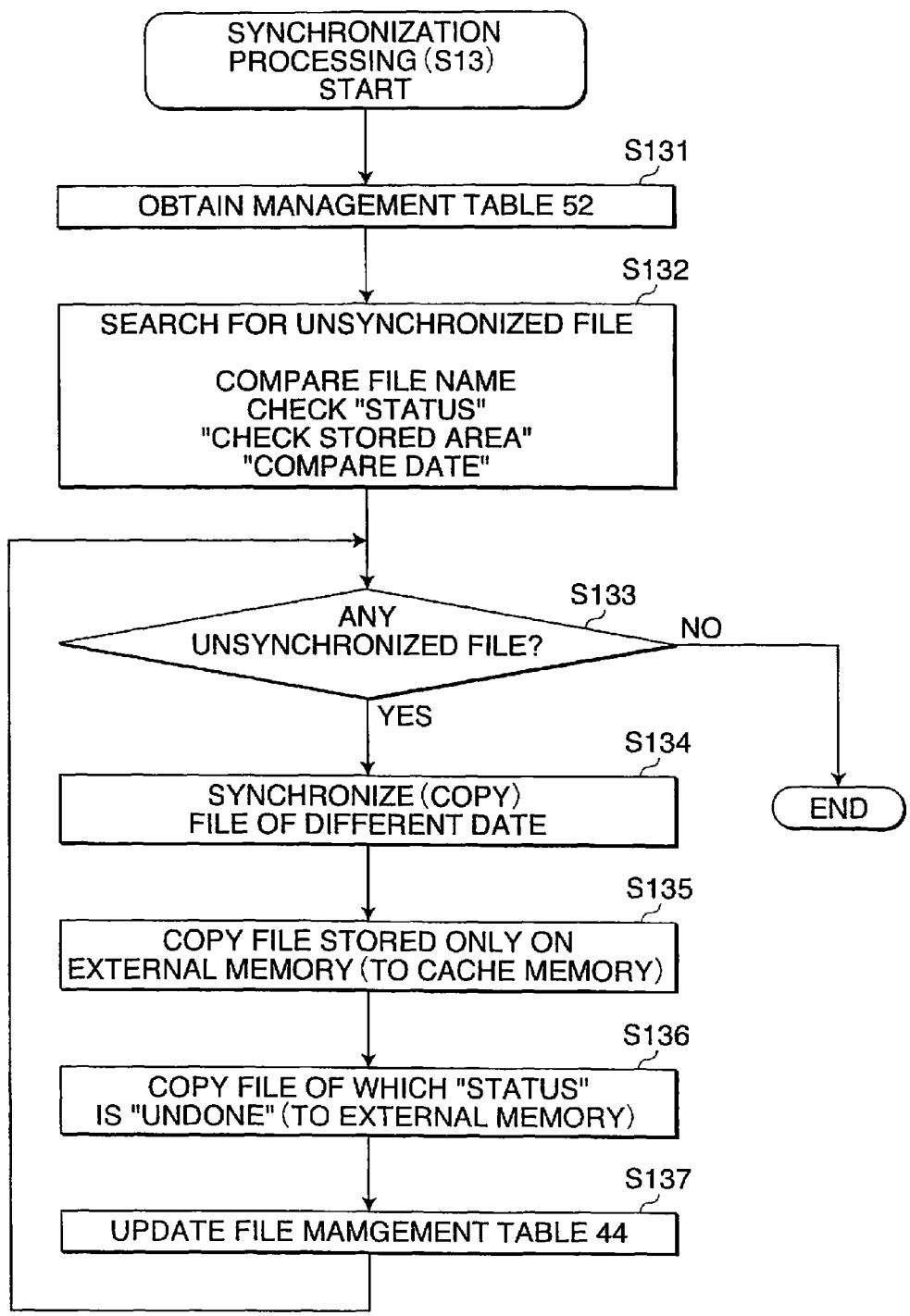
FIG. 9 is a flowchart of a synchronization processing according to the present invention.

FIG. 9 shows a flowchart showing an example of a synchronization processing according to the present invention.

Here, the processing as that in FIG. 6 described above will be performed.

In step S131 in FIG. 9, a request to transmit the management table 52 is given to the external memory 50 to thereby obtain the contents of the management table 52.

In step S132, an unsynchronized file is searched by comparing the management table 52 obtained and the file management table 44 in the cache memory 4.

For example, file names of the both tables are compared, and if there are files which do not coincide, they are determined as unsynchronized files. Further, files in which the last access date and the last edit date are different are determined as unsynchronized files, although having the same file name.

Further, a file in which information of the stored area is "external device" and is registered in the table 52 of the external memory 50 is determined as an unauthorized file.

Further, a file, the status of which is "undone", is a file which has never been synchronized, so it is determined as an unsynchronized file.

Further, a file which is present in the cache memory 4 but is not registered in the table 52 of the external memory 50 is also determined as an unsynchronized file.

In step S133, it is checked whether there is an unsynchronized file as a result of searching, and if not, the processing ends.

On the other hand, if there is an unsynchronized file, the processing proceeds to step S134. In steps S134, S135 and S136, for the unsynchronized file detected, the processing is performed for synchronizing a file written on the cache memory 4 and a file written on the external memory 50.

The processing in steps S134, S135 and S136 is shown as an example, and is not limited to this. There is a case where each processing is not required due to the reason for not performing synchronization, or there is a case where a processing other than this is required.

In step S134, if the last access date and the last edit date are different, a file of the older date is deleted and a file of the new date is copied.

In this step, copying may be made from the cache memory 4 to the external memory 50, or made from the external memory 50 to the cache memory 4.

In step S135, if there is a file that the stored area is "external memory", the file stored only on the external memory 50 is copied to the cache memory 4.

In step S136, if there is a file that the status is "undone", the file is copied to the external memory 50.

In step S137, for the file synchronized as described above, information such as "status" and "stored area" of the file management table 44 is updated to that showing it is synchronized. For example, the status "undone" is changed to "done".

Further, the processing is returned to step S133, and it is checked whether there is any unsynchronized file left.

Through the synchronization processing as described above, contents of the external memory connected and the cache memory 4 can be coincided.

Thereafter, a file read or write processing can be performed while keeping the synchronized state unless the external memory 50 is removed.

<Message Notification Processing>

Figure 10:
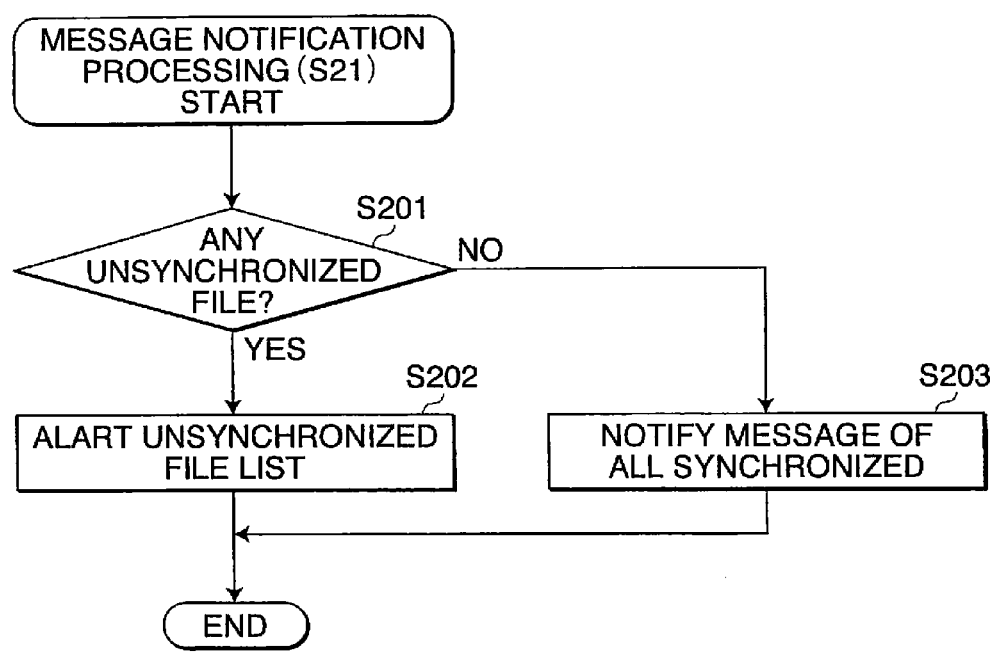
FIG. 10 is a flowchart of a message notification processing according to the present invention.

FIG. 10 is a flowchart showing a message notification processing.

In step S2, if it is determined that the connected external memory 50 is removed, the following warning message is notified to the user. However, this message is for alerting that synchronization is not taken since the external memory 50 is removed, so the user may continue the file editing after notification.

That is, the user can continue file editing without any special operation although removing the external memory 50. This is because a part of the file, altered by the editing after the external memory is removed, is to be stored on the cache memory 4.

In step S201 in FIG. 10, the control unit 1 confirms the "status" of the file management table 44 in the cache memory 4, and checks whether there is an unsynchronized file in the cache memory 4. If there is an unsynchronized file that "status" is "undone", the processing proceeds to step S202, and a list of unsynchronized files is prepared from the file management table 44, and the fact that there is an unsynchronized file is notified to the user.

This notification can be performed by means of various methods such as printing on a sheet or reporting by voice. The user receiving this notification can confirm that there is an unsynchronized file.

If the user does not want to accept the presence of the unsynchronized file, it is only necessary to connect the external memory 50. However, even with the unsynchronized file being present, the user may continue to edit the unsynchronized file. Thereby, it is possible to secure the continuity of file editing while giving preference to convenience for the user over security.

In step S201, if there is no unsynchronized file, the processing proceeds to step S203, and a message indicating that all files are in a synchronized state is notified to the user.

<State Detection Processing>

Figure 11:
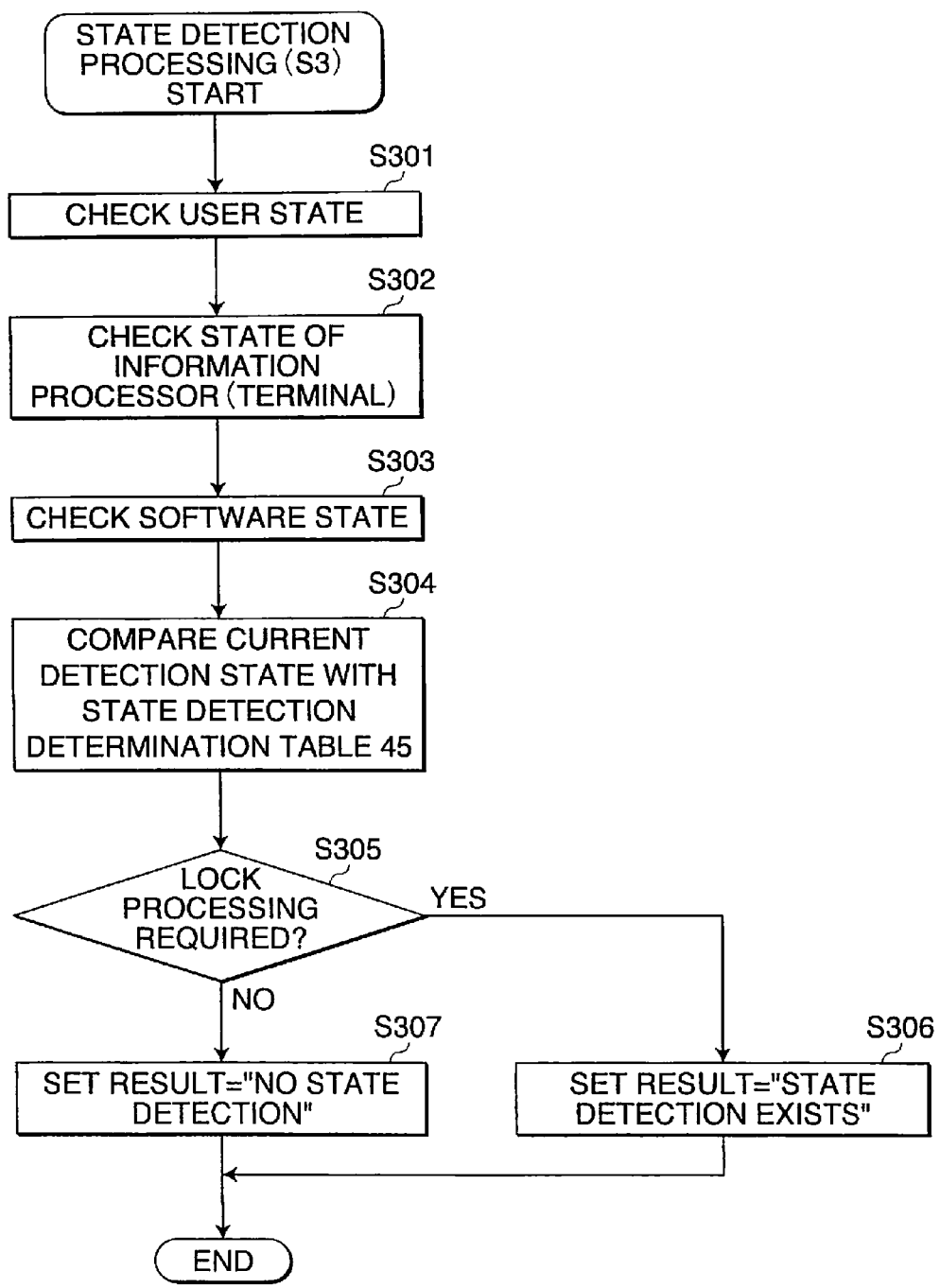
FIG. 11 is a flowchart of a state detection processing according to the present invention.

FIG. 11 is a flowchart showing a state detection processing (step S3).

It is preferable that the state detection processing be operated real time as much as possible for ensuring security. Therefore, the processing may be operated regularly as a different task, not by the flow as shown in FIG. 7.

In step S301, the user status detection unit 21 checks the user status. For example, communication with a non-contact IC card on which ID information specifying the user is stored is tried, and when the communication is established and the ID information is confirmed, the user state is determined as normal. If it is normal, a flag indicating the current user statues is set to "normal (o)".

On the other hand, if the communication is not established so presence of a user cannot be confirmed, it is recognized as a risky state in security, so the user status is determined as abnormal. Then, a flag indicating the current user status is set to "abnormal (x)".

Alternatively, the user status can be checked in the following manner.

For example, a terminal communicates with a wireless authentication device such as a mobile phone held by the user, and the ID number registered in the terminal and the ID number of the mobile phone are checked.

In step S302, the terminal state detection unit 22 checks the terminal state.

In this step, it is checked whether the processor is restarted, connection network is changed, an external memory is removed, and the like.

Whether the external memory 50 is removed is detected by the external memory detection unit 5.

For example, if it is detected that the processor is restarted, it is recognized as a risky state in security, so a flag of the current terminal state is set to "abnormal (x)".

In step S303, the software state detection unit 23 checks the activation state of the software. For example, it is checked whether software unauthorized by the user is activated. This can be realized such that a program for monitoring the activation state of the software sequentially writes the activation state on a security chip, and checking is performed based on the changes.

If unauthorized software is activated, it is recognized as a risky state in security, so a flag of the current software status is set to "abnormal (x)". If such an activation of software is not confirmed, the activation state of the software is recognized as normal, so a flag of the current software status is set to "normal (o)".

In step S304, it is checked that to which of the state detection determination table 45 the set values of the current status flag by the three status detections correspond.

For example, if the user status="o" and the software status="x" in the current three status flags, they correspond to the state shown in the top part of the table 45, so it is found that the lock processing is required. Further, the contents of the lock processing are found as the erasure processing and the encryption processing.

Further, if the user status="x" and the software status="x", they correspond to the state shown at the bottom of the table 45. Even in this case, it is found that the lock processing of "erasure and encryption" is required.

On the other hand, if the user status="o" and the software status="o", it is determined that the lock processing is not required.

In step S305, if the lock processing is required as a result of the comparison determination, the processing proceeds to step S306, and the result is set to "state detected (the lock processing required)", and the processing ends. If the lock processing is not required, the processing proceeds to step S307, and the result is set to "state not detected (no lock processing required)", and the processing ends.

<Lock Processing>

Figure 12:
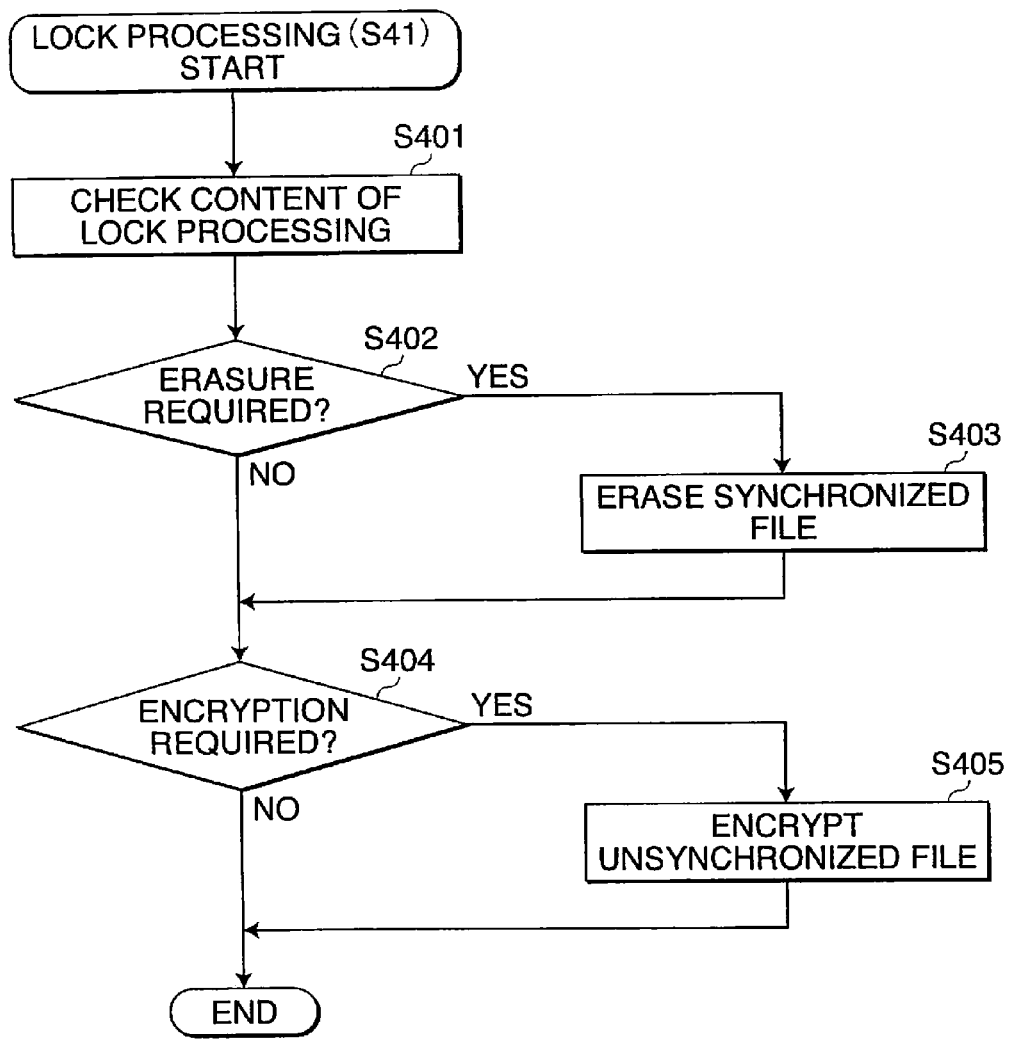
FIG. 12 is a flowchart of a rock processing according to the present invention.

FIG. 12 shows a flowchart of a lock processing.

A lock processing includes at least one of erasure and encryption of a file.

In order to do so, first, in step S401, the control unit 1 refers to the state detection determination table 45 of the cache memory 4, finds determination corresponding to the current status flag, and checks the content of the lock processing corresponding to the determination.

In step S402, if erasure is included in the required lock processing, the processing proceeds to step S403. If it is not included, the processing proceeds to step S404.

In step S403, a "done" file is extracted from "status" information in the file management table 44. That is, a synchronized file is extracted. Then, the erasure unit 8 erases the partial file of the synchronized file stored on the cache memory 4.

For example, in the status table 44 in FIG. 2, two "done" files (A.txt, BBBB.doc) are files subject to erasure, and a partial file of the files stored on the cache memory 4 is erased.

By erasing a partial file in the cache memory 4 as described above, if only the processor is stolen, the original file cannot be edited. That is, unauthorized leakage and unauthorized use of file can be reduced.

Further, even a partial file in the cache memory are erased, one identical to the partial file synchronized is stored on the external memory 50. Therefore, by connecting the external memory 50 to the processor, the original file can be edited continuously.

In step S404, if encryption is included in the required lock processing, the processing proceeds to step S405.

In step S405, a file that the "status" is "undone" in the file management table 44 is extracted, and the encryption unit 6 encrypts the partial file, stored on the cache memory 4, of the file.

Encryption is performed by using the terminal key KEY1 (47), for example. The encrypted partial file is overwritten on the cache memory 4.

Thereby, since the partial file, stored on the cache memory 4, of the unsynchronized file is encrypted, a third party who does not know the terminal key KEY1 cannot decrypt the unsynchronized file.

In other words, if only the processor is stolen, unauthorized use of the file can be reduced.

Further, if a partial file of the unsynchronized file is stored on the cache memory 4 in the encrypted state, when an authorized user edits the unsynchronized file, it is only necessary to enter the terminal key KEY1 to thereby decrypt the encrypted partial file. By combining the decrypted file and a partial file stored on the HDD 3, the unsynchronized file is decrypted.

In other words, editing of the unsynchronized file can be continued easily only with an entering operation performed on the processor side, without connecting the external memory 50. Thereby, convenience for the user can be ensured.

<File Read Processing>

Figure 13:
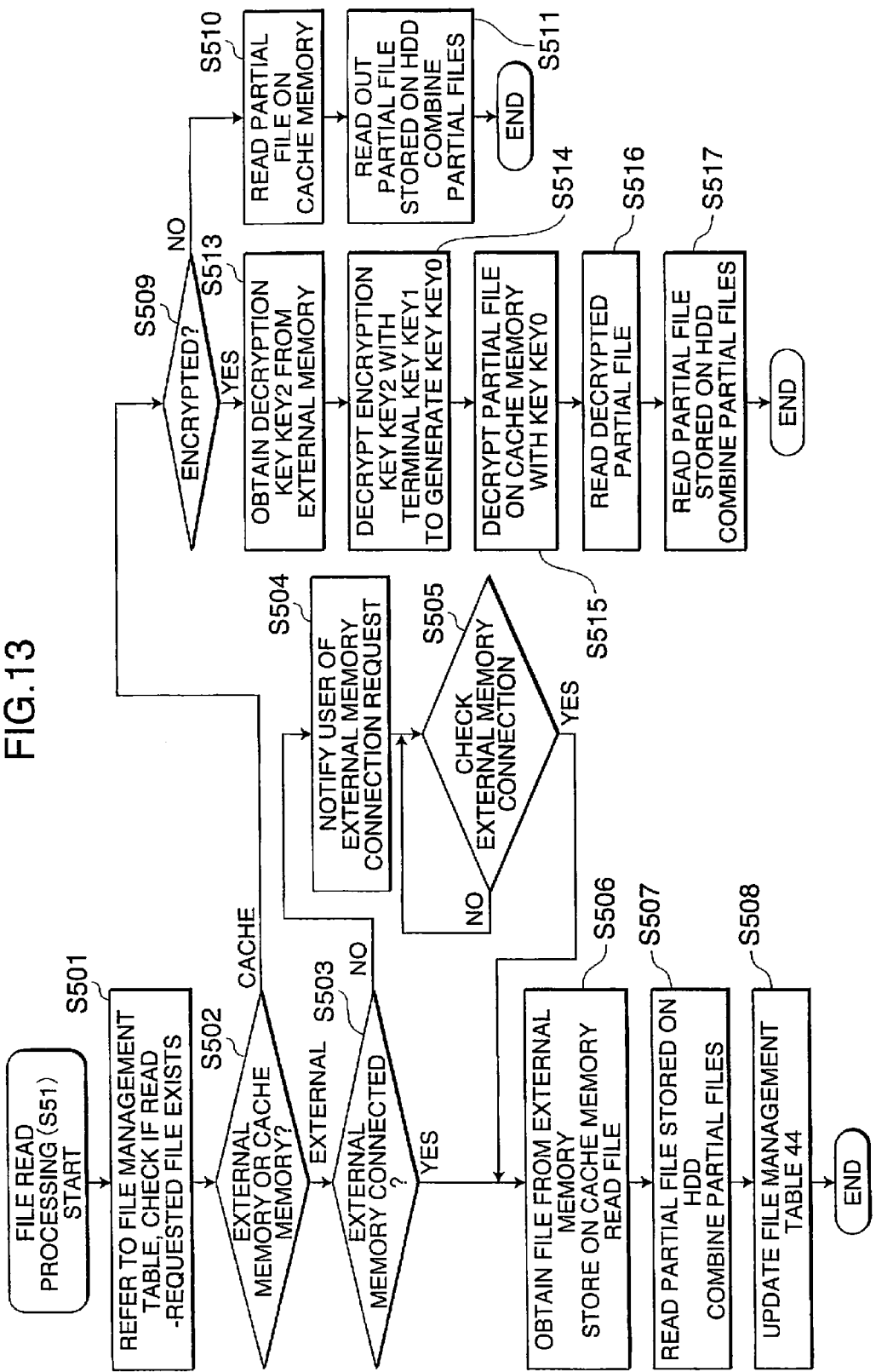
FIG. 13 is a flowchart of a file read processing according to the present invention.

FIG. 13 shows a flowchart of an example of a file read processing.

When a file read request is made by an instruction from the user, the read request includes information specifying the file. For example, the file name is included.

First, in step S501, the control unit 1 checks where the file having the file name included in the read request is stored. At this time, the file management table 44 shown in FIG. 2 is used.

The file name in the read request is found from the file management table 44, and "stored area" associating with the file name is extracted.

In step S502, it is determined whether the stored area is "cache memory" or "external memory", and if it is the cache memory 4, the processing proceeds to step S509, and if it is the external memory 50, the processing proceeds to step S503.

In step S503, it is checked whether the external memory 50 is currently connected. If it is not connected, the processing proceeds to step S504, and a notification urging to connect the external memory is outputted to the user.

In step S505, it is waited until the external memory 50 is connected, and after confirming the connection, the processing proceeds to step S506.

In step S505, the external memory in FIG. 8 may be subject to the validity determination processing.

In step S506, a partial file stored on the external memory 50 of the file which is read-requested is obtained from the external memory 50. The obtained partial file is stored on the cache memory 4. Then, the obtained partial file is read out.

In step S507, a partial file, stored on the hard disk HDD 3, of the read-requested file is read out. Then, by combining the partial file read out from the external memory 50 and the partial file read out from the HDD 3, the original file which is read-requested is decrypted.

In step S508, for the file which is read-requested updates the file management table 44. The "status" of the file which is read-requested is changed to "done", and the last access date is changed to the current date, and "stored area" is changed to "Disk".

Hereinafter, the file read-requested becomes a state editable by the user.

In step S502 in FIG. 13, if a partial file of the file read-requested is determined as being stored on the cache memory 4, in step S509, it is checked whether the partial file stored on the cache memory 4 is encrypted.

Whether it is encrypted or not can be found by checking the head part of the file, for example. If it is encrypted, the processing proceeds to step S513, and if not encrypted, the processing proceeds to step S510.

In step S510, since the partial file stored on the cache memory 4 is not encrypted, the partial file is read out as it is.

In step S511, the partial file, stored on the hard disk HDD 3, of the file read-requested is read out.

Then, the partial file stored on the cache memory 4 and the partial file stored on the HDD 3 are combined. Thereby, the file read-requested is decrypted to be a state editable by the user.

In step S509, if the partial file stored on the cache memory 4 is found to be encrypted, in step S513, a decryption key KEY2 is obtained from the external memory 50 to decrypt the partial file.

If the external memory 50 is not connected, the user is required to connect the external memory 50, same as steps S504 and S505. After connection, the decryption key KEY2 (55) stored in the external memory 50 is transmitted to the processor side.

In step S514, the obtained decryption key KEY2 (55) is decrypted with the terminal key KEY1 (47) to thereby create the new key KEY0. The newly created key KEY0 is a decryption key to decrypt the encrypted partial file.

In step S515, the decryption unit 7 decrypts the encrypted partial file in the cache memory 4 by using the newly generated key KEY0.

In step S516, the decrypted partial file is read out.

In step S517, the partial file stored on the hard disk HDD 3 is read out, and the two readout partial files are combined to thereby decrypt the file read-requested, same as step S511.

Thereafter, the file read-requested is in a state editable by the user.

As described above, when a file read request is made, the authorized user can read out the file by only entering a general read instruction without being aware that where the file is stored. Even if an unauthorized user makes a file read request, if a partial file of the file is only stored on the external memory 50, the file cannot be read out without the external memory 50, so unauthorized leakage and unauthorized use can be prevented.

Further, in the case where a partial file of the file read-requested is stored on the cache memory 4, if the partial file is encrypted, a third party who does not know the decryption key KEY2 cannot decrypt the partial file, so unauthorized leakage and unauthorized use can be prevented.

<File Write Processing>

Figure 14:
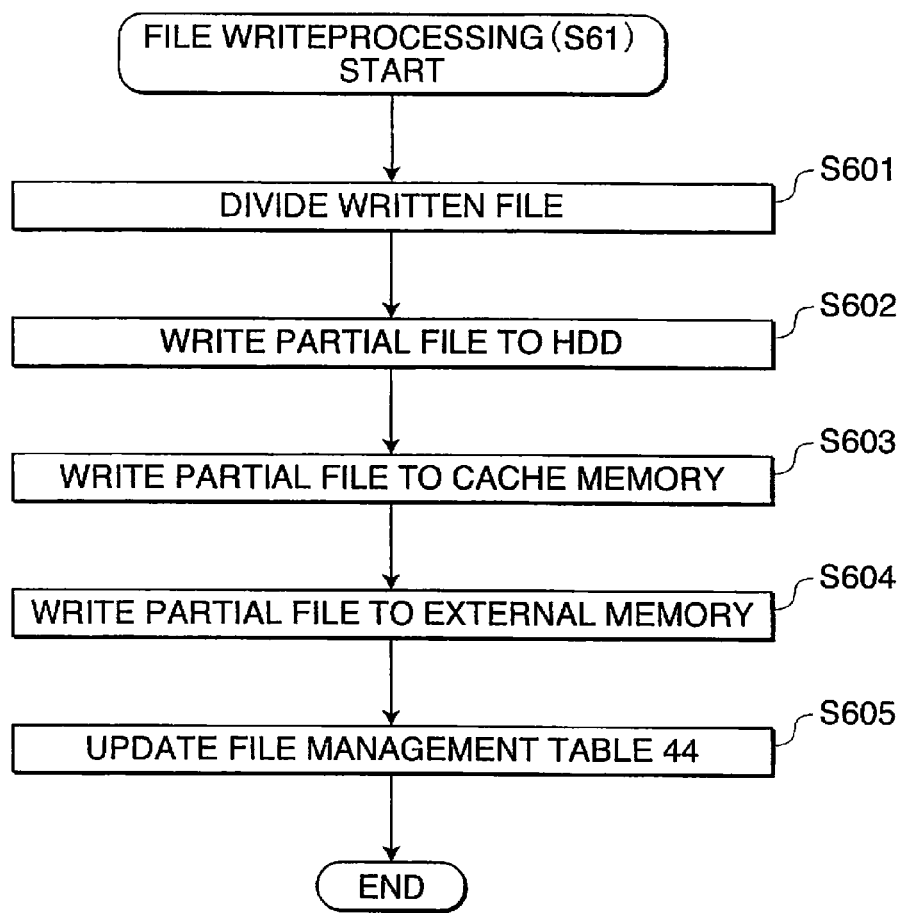
FIG. 14 is a flowchart of a file write processing according to the present invention.

FIG. 14 shows a flowchart of an example of a file write processing.

In the present invention, when an instruction of write request of an edited file is given by the user, the file is divided into two and stored. However, the number of division may be three or more, as described above.

In step S601, the control unit 1 divides the file write-requested into two. This dividing processing may be performed by using an existing method. For example, there is a method of simply dividing it into two files of almost same size, or a method of creating two files by using threshold secret distribution method.

In step S602, one partial file created by division is written on the hard disk HDD 3. At that time, the partial file may be encrypted by using the terminal key KEY1.

In step S603, the other partial file divided is written on the cache memory 4. At that time, this partial file may also be encrypted and stored.

In step S604, if the external memory 50 is connected, the other partial file is written on the external memory 50.

If the external memory 50 is not connected, this processing is not necessarily performed. However, it is also acceptable to notify the user of a message requiring the user to connect the external memory 50, and after the user connects the external memory 50, the processing of step S604 may be performed.

In step S605, the file management table 44 is updated for the file write-requested. At this time, if it is a new file, information of the file is added, and if overwriting, the last access date is changed.

Further, if it is also written on the external memory 50, the cache memory 4 and the external memory 50 are in the synchronized state, so "status" is changed to "done". Further, if it is encrypted and written, "encryption" is changed to "undone".

If the file is written as described above, the file is divided into two partial files and stored. Therefore, it is possible to prevent unauthorized use if one of the processor and the external memory is stolen.

Further, since one partial file is stored inside the cache memory 4, editing of the file can be continued even though the external memory 50 is not connected, so convenience for the user can be ensured.

<Specific Example of File Editing>

Relating to the actual stage that a user edits a file, a specific example will be given how the file is divided and how the divided file changes.

Figure 15:
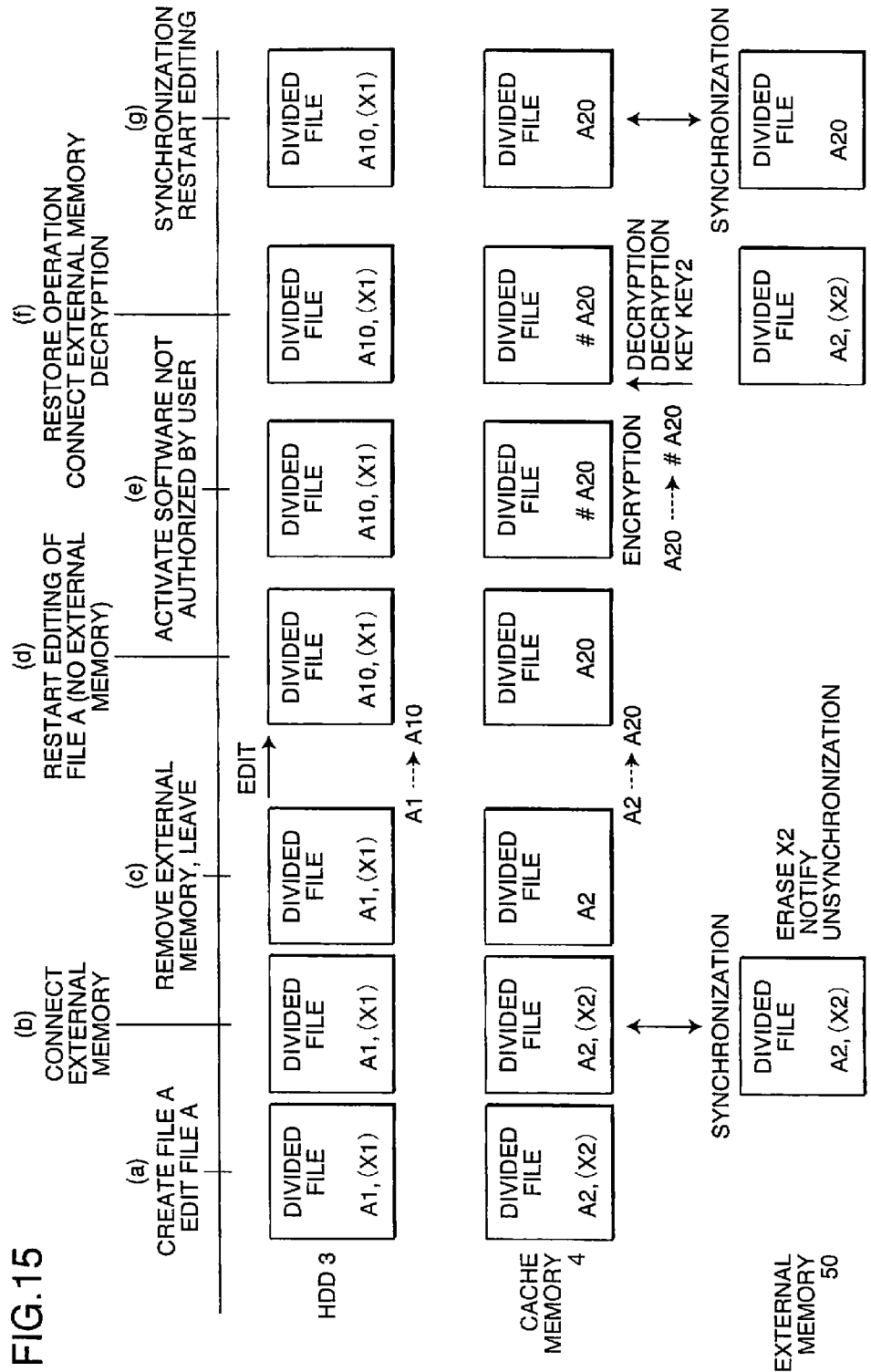
FIG. 15 is an illustration of a specific example (case 1) of changes in divided files according to the present invention.

FIG. 15 shows a specific example (case 1) of a series of edit the processing including a case where the external memory is connected and a case where unauthorized software is activated. In the case 1, first, a file A and a file X are present, and both of them are divided into two, respectively. In this case, partial files are called divided files.

In FIG. 15(a), the file X is not in the editing state. Assume that one divided file X1 is stored on the HDD 3, and the other divided file X2 is stored on the cache memory 4.

The file A is currently edited. One divided file A1 is stored on the HDD 3, and the other divided file A2 is stored on the cache memory 4. At the time of starting editing the file A, the file read processing (step S51) is performed.

In FIG. 15(b), it is assumed that a user connects the external memory 50 to the processor.

At this time, the synchronization processing (step S13) is performed for the file X and the file A between the cache memory 4 and the external memory 50, and synchronization is taken.

That is, the divided files A2 and X2 stored on the cache memory 4 are copied to the external memory 50.

In FIG. 15(c), it is assumed that the user removed the external memory 50 and left the seat. At this time, in the state detection processing (step S3), user absence detection due to leaving of the user and terminal state detection due to removal of the external memory are performed, and the corresponding lock processing (step S41) is performed.

For example, if the content of the corresponding lock processing in the state detection determination table of FIG. 4 is "erasure", the divided file X2 of the synchronized file X is erased from the cache memory 4. However, since the external memory 50 is removed completely, the divided file X2 is stored therein as it is.

Further, since the file A is currently edited, the divided file A2 in the cache memory 4 remains as it is. At this time, a warning message including a fact that the synchronized divided file is erased from the cache memory and only the unsynchronized divided file A2 remains in the cache memory is notified to the user.

In FIG. 15(d), it is assumed that the user returned to the seat and restarted editing of the file A without connecting the external memory. It is assumed that the write processing (step S61) is performed during this editing, and the divided files of the file A have been changed from A1 to A10 and from A2 to A20.

Next, in FIG. 15(e), it is assumed that software not authorized by the user is activated. At this time, in the state detection processing (step S3), the unauthorized software is detected, so the lock processing (step S41) is performed.

It is assumed that the content of the corresponding lock processing in the state detection determination table in FIG. 4 is "encryption".

In the case of FIG. 15, the divided file A20 stored on the cache memory 4 is an unsynchronized file, so it is subject to locking and is encrypted with the terminal key KEY1. That is, the divided file in the cache memory 4 is changed from A20 to #A20.

Through this encryption processing, the file A itself is also locked to be in a state where editing is impossible.

Further, to the user, a massage including a fact that unauthorized software is activated, the file A is locked, editing cannot be restarted unless the unauthorized software is terminated or removed, and the external memory 50 must be connected to restart edit.

In FIG. 15(f), it is assumed that the user who found the notification performs a recovery operation such as termination of the software, and connects the external memory 50.

When the external memory 50 is connected, the processing corresponding to steps S513 to S516 in FIG. 13 is performed, and decryption of the encrypted file #A20 is performed automatically.

That is, the decryption key KEY2 is taken out from the external memory 50, and the key KEY0 for decrypting the encrypted file #A20 is created, and by using the key KEY0, the original divided file A20 in the cache memory 4 is decrypted.

Thereby, the file A becomes editable with the divided file A10 in the HDD 3 and the decrypted divided file A20.

In FIG. 15(g), by copying the divided file A20 decrypted on the cache memory to the external memory 50, the divided files are synchronized. Thereafter, the state becomes as that shown in FIG. 15(b), so editing of the file A can be restarted.

Figure 16:
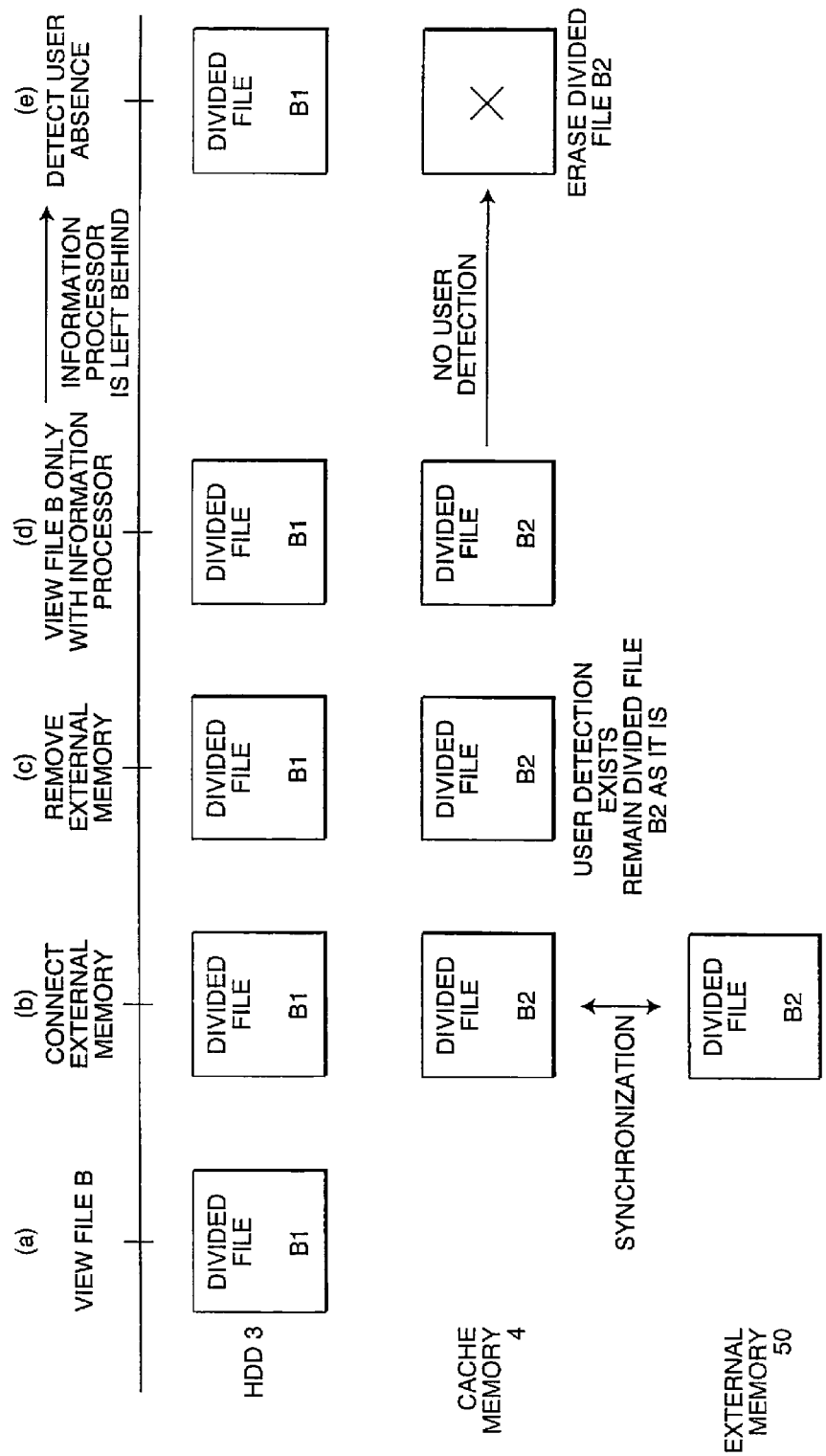
FIG. 16 is an illustration of another specific example (case 2) of changes in divided files according to the present invention.

FIG. 16 shows an illustration of another specific example (case 2) of a series of the edit processing including loss of the information processor, according to the present invention.

In this example, a case of viewing a file B, which has been prepared, will be described.

The file B is divided into two files (B1, B2), and the divided file B1 is stored on the hard disk HDD 3 and the other divided file B2 is stored on the external memory 50. Further, as shown in FIG. 16(a), it is assumed that no divided file of the file B is included in the cache memory 4.

At this time, in the file management table 44 of FIG. 2, "status" is "undone", and "stored area" is "external device".

In the state of FIG. 16(a), it is assumed that a request for viewing the file B is made. At this time, file read request of FIG. 13 is performed.

By checking the file management table 44, it is found that a file B2 of the file B is stored on the external memory 50, so a notification for urging to connect the external memory 50 is given to the user.

When the user who saw the notification connects the external memory 50, the synchronization processing is performed as shown in FIG. 16 (b).

The divided file B2 stored on the external memory 50 is copied to the cache memory 4. Then, the two divided files (B1, B2) are read out and combined to be in a state where the file B can be viewed.

In FIG. 16(c), it is assumed that the user removed the external memory 50 so as to cause the processor to be in a standby state, and the user moves while holding the processor.

In this case, it is assumed that the state of the hardware is detected by terminal detection of the state detection processing (step S3). However, since the user is moving while holding the processor, presence of the user is still detected.

If there is no lock processing corresponding to such a state detection state, the divided file B2 on the cache memory 4 is left as it is. That is, in the case of FIG. 16(c), no lock processing is performed.

Next, in FIG. 16(d), it is assumed that the user requested to view the file B only with the information processor while moving.

Since the two divided files (B1, B2) of the file B are stored on the FDD 3 and on the cache memory 4 in the processor, if the both are not encrypted, the file B can be viewed through the normal file read processing (steps S510, S511).

Next, it is assumed that the information processor is left behind or stolen while the user is moving.

In this case, since the processor and the user are apart from each other, it is detected that the user is absent by the user detection processing.

That is, it is detected that the user is absent by the state detection processing (step S3), and the corresponding lock processing is performed.

If "erasure" is included in the corresponding lock processing, the file B2 included in the cache memory 4 is a synchronized file, so it is an erasing object. Thereby, the file B2 is erased (FIG. 16(e)).

In FIG. 16(e), since it is detected that the user is absent, only one divided file B1 of the file B remains in the information processor.

Therefore, even if a third party requests to read out the file B thereafter, the file B cannot be read out without the external memory 50 on which the divided file B2 is stored.

In other words, even if only the information processor of the present invention is stolen, in a case where file synchronization has been taken, one divided file of the synchronized file is not stored on the processor. Therefore, it is possible to prevent unauthorized use or unauthorized leakage of the file.

Further, in the case shown in FIG. 16, after the user removes the external memory 50, the divided file B2 on the cache memory 4 is erased automatically when the user just moves far away from the processor without requiring any special processing to the divided file B2 synchronized on the cache memory. Therefore, burden on the user for ensuring security is low, and convenience can be improved.

According to the present invention, operating states of a processor (processing unit) regarding such as a user, a terminal and software are checked and a lock processing is performed to a divided second partial file stored on a second storage section in accordance with the detected states. Therefore, it is possible to further reduce unauthorized leakage and unauthorized use of a file while ensuring convenience of a user.

In particular, as for a partial file synchronized between a second storage section and a removable external nonvolatile memory, it is possible to prevent unauthorized leakage and unauthorized use of a file by erasing the synchronized partial file from the second storage section.

Further, as for a partial file unsynchronized between the second storage section and the removable external nonvolatile memory, by encrypting it instead of erasing it, subsequent editing by an authorized user can be easily performed without connecting the nonvolatile memory to thereby ensure convenience for the user, and if a third party does not know the decryption method, it is possible to prevent unauthorized use or unauthorized leakage of the file by the third party.

What is claimed is:

1. An information processing unit having an information division recording function in which a file is divided and stored, comprising:
   a first storage section for storing a first partial file of a file divided,
   a second storage section for storing a second partial file,
   a state detection section for checking an operating state of the information processing unit and detecting that the operating state has changed in a specific manner,
   a control section for performing a lock processing in accordance with the state detected to the second partial file stored on the second storage section when the state detected by the state detection section is determined as a risky state in which unauthorized access can be performed, and
   an external memory detection section for detecting whether a removable external nonvolatile memory is connected or not,
   wherein the lock processing includes an erasure processing of a synchronized file and an encryption processing of unsynchronized file, and the synchronized file is a second partial file in the second storage section which has also been stored on a removable external nonvolatile memory, and the unsynchronized file is a second partial file in the second storage section which is not stored on a removable external nonvolatile memory, and
   when the external memory detection section detects that a nonvolatile memory is connected, the control section copies a second partial file stored on the second storage section but not stored on the nonvilatile memory to the non-volatile memory.

2. The information processing unit according to claim 1, wherein the state detection section includes at least one of a user status detection section for detecting identification information for specifying a user and an attending state indicating presence of a user; a terminal state detection section for detecting an operating state of hardware constituting the information processing unit; and a software state detection section for detecting an operating state of software of which activation is authorized.

3. The information processing unit according to claim 1, further comprising an external memory detection section for detecting whether a removable external nonvolatile memory is connected or not, wherein, when the external memory detection section detects that the nonvolatile memory is not connected any more,
   the control section erases only the second partial file stored on the second storage section, out of the second partial files stored on both the second storage section and the nonvolatile memory.

4. The information processing unit according to claim 1, further comprising an external memory detection section for detecting whether a removable external nonvolatile memory is connected or not, wherein, when the external memory detection section detects that the nonvolatile memory is not connected any more,
   the control section does not erase the second partial file stored on the second storage section, if it is currently edited, out of the second partial files stored on both the second storage section and the nonvolatile memory.

5. The information processing unit according to claim 1, further comprising an external memory detection section for detecting whether a removable external nonvolatile memory is connected or not, wherein, when the external memory detection section detects that the nonvolatile memory is not connected any more,
   the control section encrypts the second partial file stored on the second storage section if the second partial file stored on the second storage section and the second partial file stored on the nonvolatile memory do not coincide.

6. The information processing unit according to claim 5, wherein the second partial file encrypted is decrypted by using a decryption key stored on an external nonvolatile memory.

7. The information processing unit according to claim 1, wherein, when the state detection section detects the risky state, the control section performs one or both of a lock processing to erase the synchronized file and a lock processing to encrypt the unsynchronized file.

8. The information processing unit according to claim 7, wherein, if the state detection section detects that presence of a user is not confirmed and software not authorized by the user is activated, the control section determines the state as a risky state, and performs the erasure processing of the synchronized file and the encryption processing of the unsynchronized file.

9. The information processing unit according to claim 7, wherein, if the state detection section detects that presence of a user is not confirmed and an external memory is not connected, the control section determines the state as a risky state, and performs the erasure processing of the synchronized file.

* * * * *